Feb. 15, 1966  T. W. WINSTEAD  3,234,594
APPARATUS FOR FORMING PLASTIC CONTAINERS
Original Filed Sept. 7, 1961  7 Sheets-Sheet 1

INVENTOR
Thomas W. Winstead

BY Raphael Semmes
ATTORNEYS

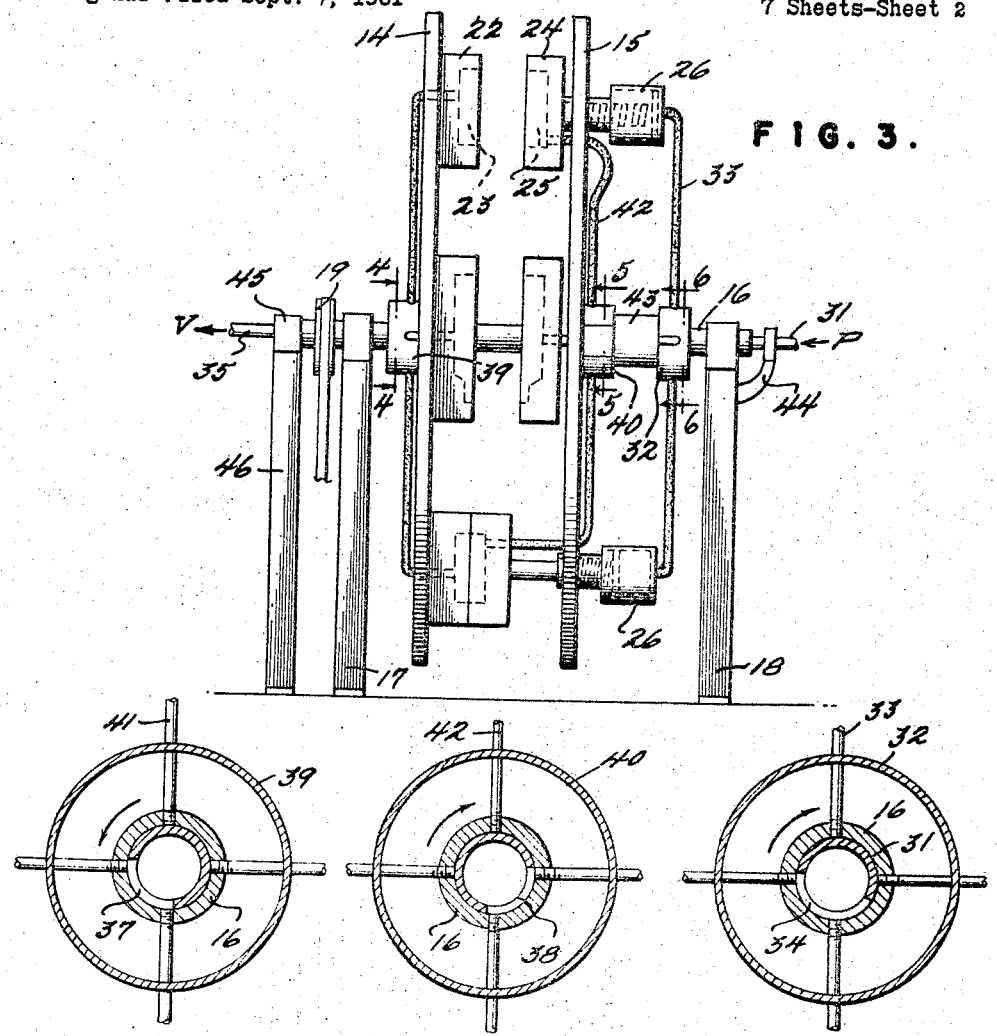
Feb. 15, 1966   T. W. WINSTEAD   3,234,594
APPARATUS FOR FORMING PLASTIC CONTAINERS
Original Filed Sept. 7, 1961   7 Sheets-Sheet 2
FIG. 3.
FIG. 4.   FIG. 5.   FIG. 6.
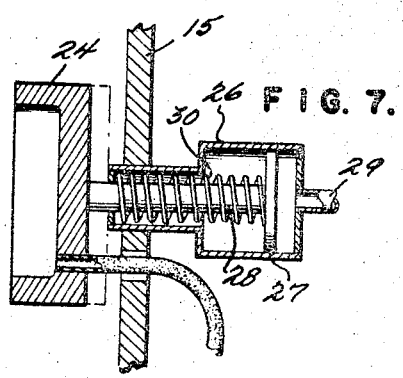
FIG. 7.
INVENTOR
Thomas W. Winstead
BY Raphael Semmes
ATTORNEYS Feb. 15, 1966     T. W. WINSTEAD     3,234,594
APPARATUS FOR FORMING PLASTIC CONTAINERS
Original Filed Sept. 7, 1961     7 Sheets-Sheet 3

INVENTOR
Thomas W. Winstead
BY Raphael Semmes
ATTORNEY

Feb. 15, 1966 T. W. WINSTEAD 3,234,594
APPARATUS FOR FORMING PLASTIC CONTAINERS
Original Filed Sept. 7, 1961 7 Sheets-Sheet 4
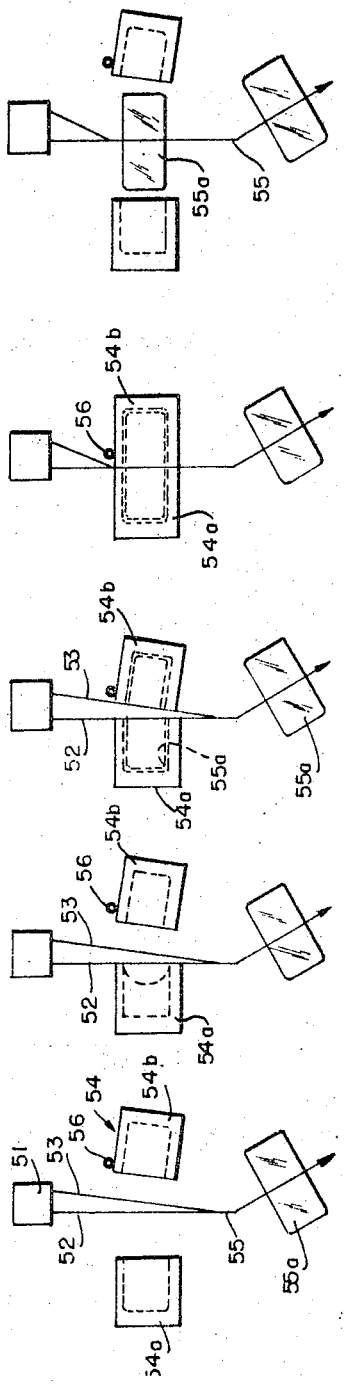
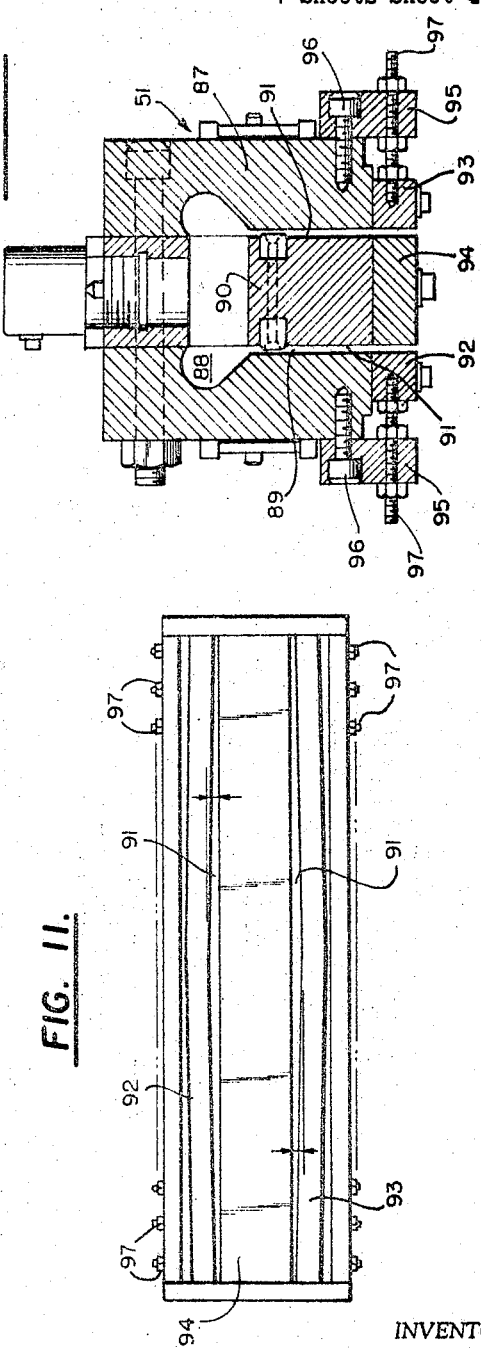
INVENTOR
Thomas W. Winstead
BY Raphael Semmes
ATTORNEY Feb. 15, 1966  T. W. WINSTEAD  3,234,594
APPARATUS FOR FORMING PLASTIC CONTAINERS
Original Filed Sept. 7, 1961  7 Sheets-Sheet 5
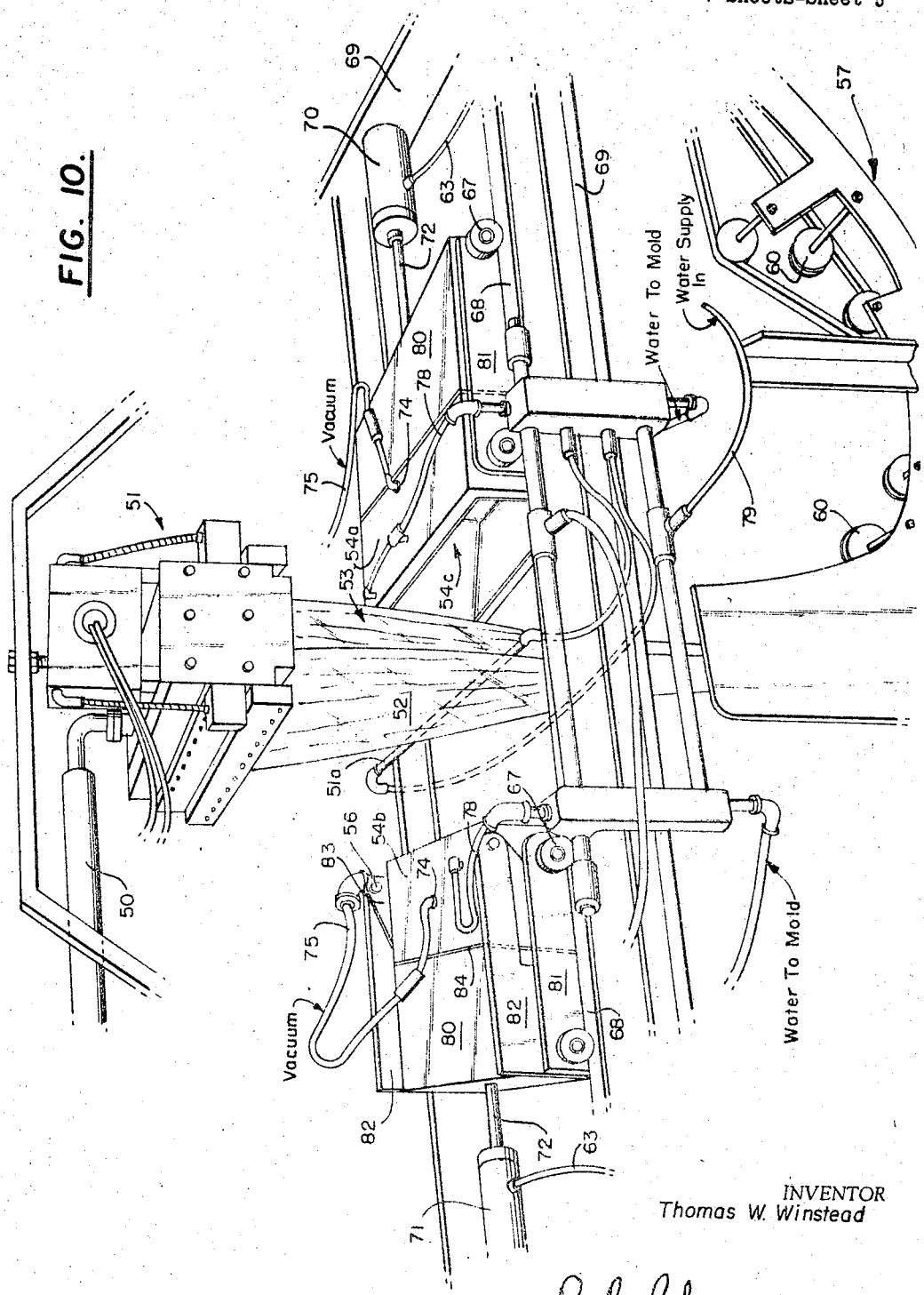
INVENTOR
Thomas W. Winstead
BY  Raphael Semmes
ATTORNEY Feb. 15, 1966 T. W. WINSTEAD 3,234,594
APPARATUS FOR FORMING PLASTIC CONTAINERS
Original Filed Sept. 7, 1961 7 Sheets-Sheet 6
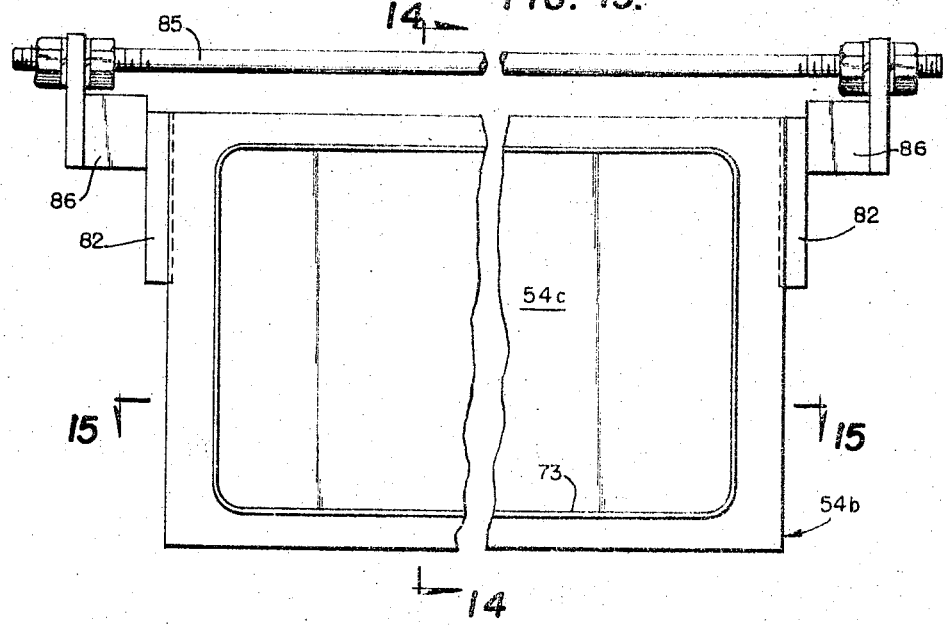
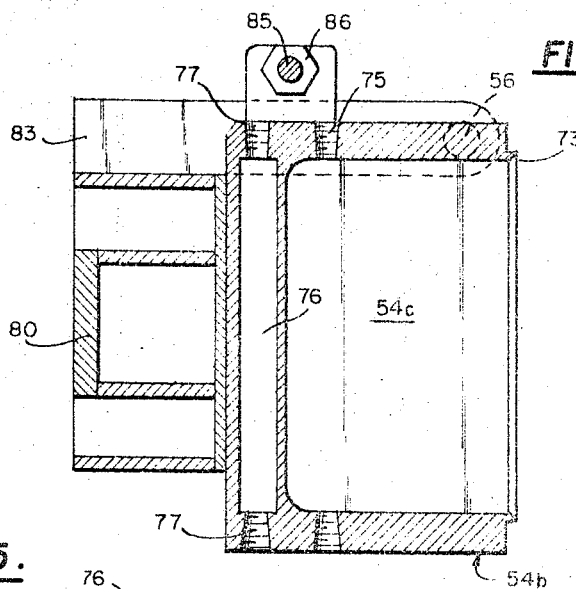
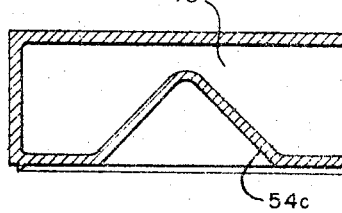
INVENTOR
Thomas W. Winstead
BY
ATTORNEY

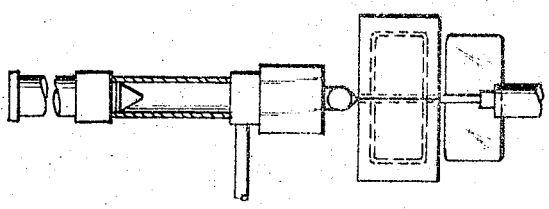
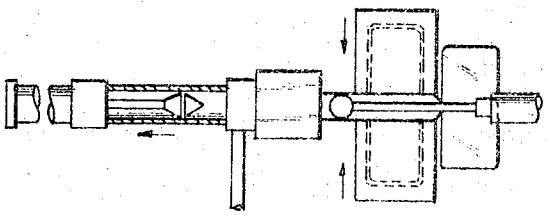
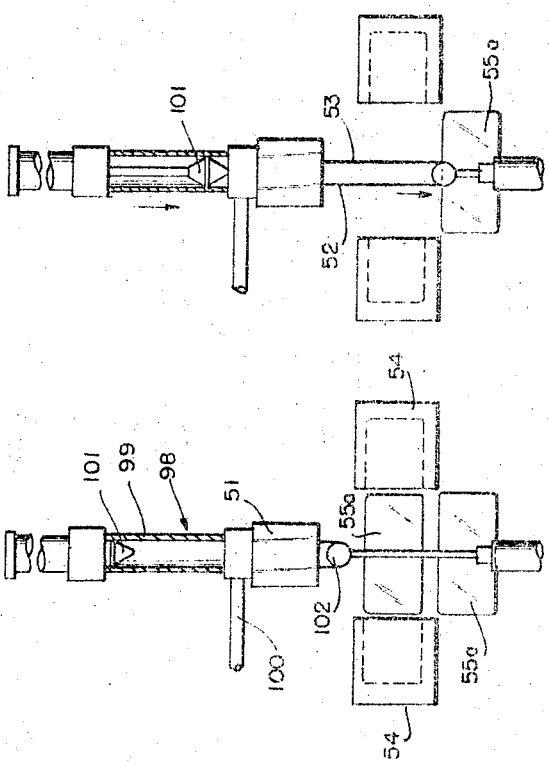
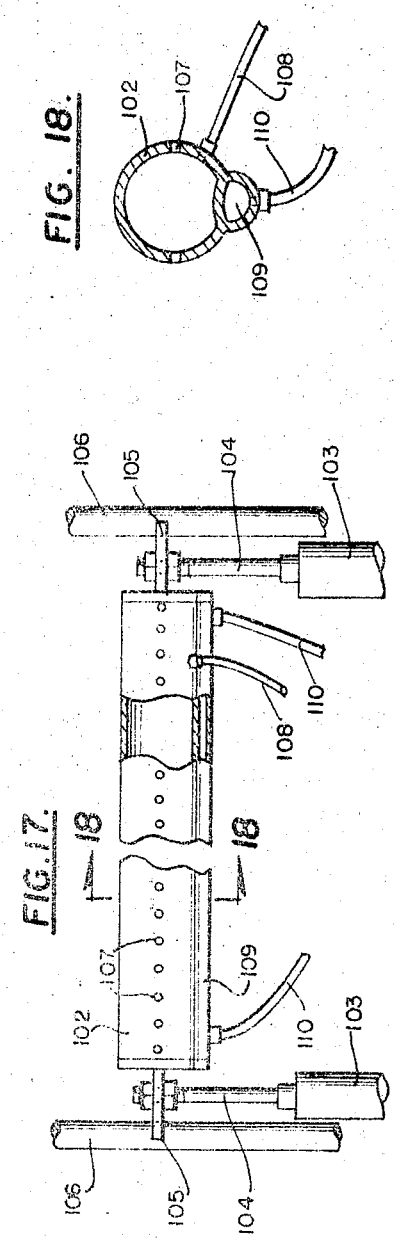

3,234,594
APPARATUS FOR FORMING PLASTIC CONTAINERS
Thomas W. Winstead, Baltimore, Md., assignor to Hedwin Corporation, New York, N.Y., a corporation of Maryland
Original application Sept. 7, 1961, Ser. No. 136,993. Divided and this application July 13, 1964, Ser. No. 382,200
15 Claims. (Cl. 18—4)

The present invention relates broadly to apparatus for manufacturing containers, the present application being a division of application Serial No. 136,993, filed September 7, 1961, which is a continuation-in-part of application Serial No. 528,772, filed August 16, 1955, and now abandoned.

More specifically, the invention consists in new and useful improvements in apparatus for manufacturing containers of plastic material in either a continuous or semi-continuous vacuum forming operation, using two mold halves which close against each other to seal the halves. The present invention depends both for forming and sealing on the heat capacity of plastic sheeting resulting from its extrusion.

Heretofore, plastic containers in the nature of bottles or other diverse forms have been manufactured by different methods and processes. None of these, however, have been entirely satisfactory or sufficiently economical. It has also not been possible heretofore to make completely enclosed containers of plastic material, and problems have arisen in previous known methods of controlling thickness distribution in the finished containers.

Accordingly, it is an object of the present invention to provide apparatus for a continuous or semi-continuous method for manufacturing plastic containers of diverse shapes in an inexpensive and rapid manner, and which is primarily adapted for manufacturing polyethylene containers of varying shapes.

Another object of the present invention is to provide apparatus for continuous or semi-continuous methods for manufacturing plastic containers which are inherently less expensive than either blown or injection molded plastic containers, because of the fact that material distribution is more efficient and the thickness of the material can be controlled to meet practically any requirement. Additionally, the operation and method to be described hereinafter is completely automatic.

According to the present invention, polyethylene or other plastic material utilized is extruded from an extrusion die in two hot sheets which are simultaneously vacuum formed into the desired shape while still hot, and before the inner surfaces thereof have dropped in temperature. A seal or weld is effected by forcing two molds together causing contact of the hot material around the periphery of each mold cavity.

Another object of the present invention is to provide apparatus for continuous or semi-continuous manufacture of completely enclosed containers without parts or openings of any kind, of plastic material, which are useful where openings are undesirable, or in food or pharmaceutical containers where sanitation or sterilization is important.

Another object of the present invention is to provide apparatus for a method wherein the thickness of extruded sheets of plastic material utilized for manufacturing the containers can be varied in cross-section by initial adjustments in the die, which adds additional thickness to compensate for stretching into the deepest portions of molds and to thicken the containers at corners or other critical areas when desired.

A still further object of the present invention is to provide an apparatus giving greater versatility of optimum thickness distribution of material than is possible in any apparatus currently being used.

An additional object of the present invention is to provide a continuous or semi-continuous vacuum forming operation using two mold halves which close against each other to seal half containers and depending for both forming and sealing on the heat capacity of the sheeting resulting from its extrusion. Due to this, a high rate of production can be attained and excellent control over thickness distribution is provided, thereby minimizing costs in a finished product while increasing rates, and cooling times are minimized because of the lack of unnecessarily thick sections which inherently delay the cooling cycle.

A still further object of one form of the present invention is to provide apparatus wherein a plurality of mold sets are rotatably mounted and two parallel sheets of polyethylene plastic are extruded substantially parallel to one another and fed between two mold halves which, thereafter, are brought together against the sheets and wherein a vacuum is drawn in each mold half prior to sealing to give form to the container. The molds are then brought together at the periphery of the mold sets to form the finished container, while utilizing the heat of extrusion for effecting the weld. Preferably, a raised edge is provided around the periphery of the mold cavities, in either one or both halves, which permits applying sufficient pressure to form a seal around the bottle and form a bead weld on the inside of the bottle, leaving a tear seal at the outer surface of the container which permits it to be knocked or torn from the selvage.

A further object of the invention is a modified embodiment, particularly adaptable for the manufacture of plastic containers of quart, gallon and five-gallon capacities, for example, is to provide apparatus wherein two sheets of plastic material are extruded from a dual die, vertically downward for vacuum forming engagement with two opposed mold halves arranged for horizontal movement into and out of engagement in a fixed horizontal plane to intermittently form and join container halves, wherein the formed containers are partially cut from but remain in engagement with the selvage to facilitate their conveyance to a convenient point of manual removal.

Another object of the invention in this embodiment is to provide means to insure parallel engagement of both mold halves with their respective sheets of plastic material immediately prior to vacuum molding and to compensate for the converging angles of the unformed areas of said sheets after advanced portions thereof have been joined by the preceding forming step.

In accordance with the invention, a plurality of mold halves work in sequence on the two sheets of extruded polyethylene plastic. The first step is the vacuum forming of the two halves of the container; the second step is the sealing of the two thus formed halves by pressing opposed mold halves together and which pressure is maintained until the containers have chilled sufficiently to prevent distortion; the thus formed containers are released by retraction of the mold halves. The finished containers remain in a continuous sheeting and are thereafter torn or ruptured from the continuous strip, which thereafter is granulated for re-use in order to eliminate waste.

The molds of the present invention can be cooled if desired to facilitate and speed up the operation.

While several embodiments of apparatus by which the present invention can be performed are shown in the accompanying drawings and will be described in detail, manifestly the same basic principles are applicable in many other ways. As an example, two sheets can be extruded from separate dies and/or separate machines. The sheets can be extruded as an oval tube with one or both ends closed. The operation can be performed horizontally instead of vertically, and, as will be apparent, it can be accomplished on a linear basis or a reciprocating basis as well as a rotating basis. Many mechanical methods of closing the molds, cooling them, moving them with the sheeting and evacuating them can be effected.

Other and further objects and advantages of the invention will be apparent from the following detailed description of various forms of apparatus for practicing the present invention, taken together with the accompanying drawings in which:

FIG. 3 is an end elevational view of the molding apparatus;

FIG. 4 is a sectional view taken on line 4—4 of FIG. 3;

FIG. 5 is a sectional view taken on line 5—5 of FIG. 3;

FIG. 6 is a sectional view taken on line 6—6 of FIG. 3;

FIG. 7 is a fragmentary, enlarged, sectional view of one form of mold actuating means for use with the rotating form of the invention;

Figure 8:
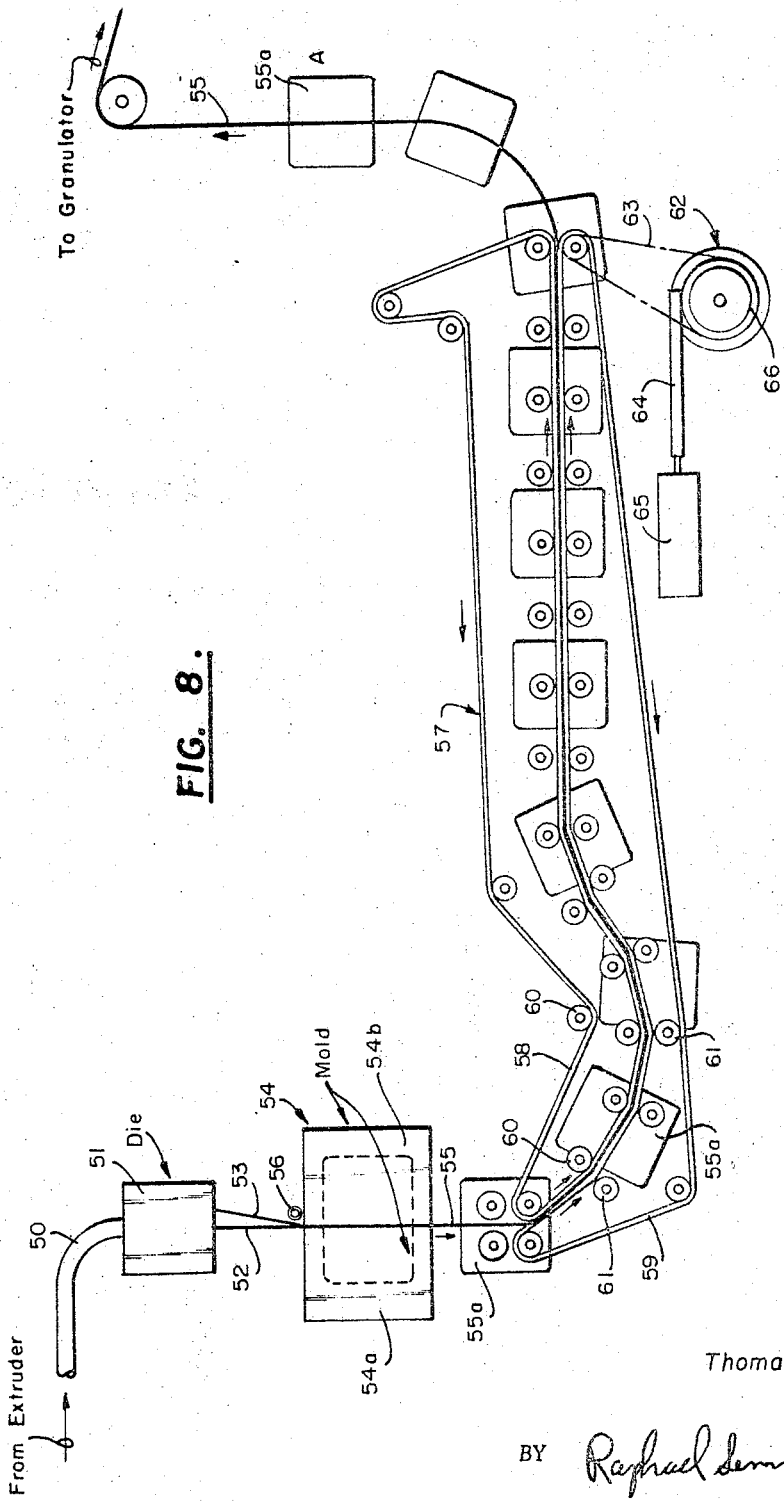
FIG. 8 is a diagrammatic view illustrating a modified form of apparatus for practicing the invention in a continuous operation with vertically stationary, horizontally movable mold halves.

FIGS. 9A to 9E diagrammatically illustrate the sequential steps of the method and apparatus illustrated in FIG. 8;

FIG. 10 is a fragmentary perspective view of apparatus for practicing the invention in accordance with the embodiment shown in FIG. 8;

FIG. 11 is a diagrammatic illustration of the extrusion die adjustment for effecting thickness distribution in the extruded sheets;

FIG. 12 is a transverse sectional view of the extrusion die;

FIG. 13 is a broken plan view of the open face of one mold half;

FIG. 14 is a sectional view taken on line 14—14 of FIG. 13;

FIG. 15 is a further sectional view taken on line 15—15 of FIG. 13;

FIGS. 16A to 16D are diagrammatic illustrations of the sequential steps in practicing a further modified form of the invention wherein the process is semi-continuous;

FIG. 17 is an enlarged elevational view, partly in section, illustrating the sheet pull-down bar employed in the process illustrated in FIGS. 15A to 15D; and FIG. 18 is a transverse sectional view taken on line 18—18 of FIG. 17.

In the drawings, referring first to the rotary form shown in FIGS. 1 to 7, an extruder 10 is generally shown having a single extruding die 11, which extrudes two substantially parallel sheets 12 and 13 of thermoplastic material, preferably polyethylene. The sheets are extruded vertically downward into a container forming and sealing machine, and, in this embodiment, the container being produced is in the form of a bottle.

The forming machine consists of two spaced circular discs 14 and 15, rotatably mounted on axle 16 supported by stands 17 and 18. The axle is hollow for purposes hereinafter set forth. The axle, and, accordingly, the discs 14 and 15, are rotated by means of pulley 19 over which belt 20 is entrained and driven through motor 21.

Figure 1:
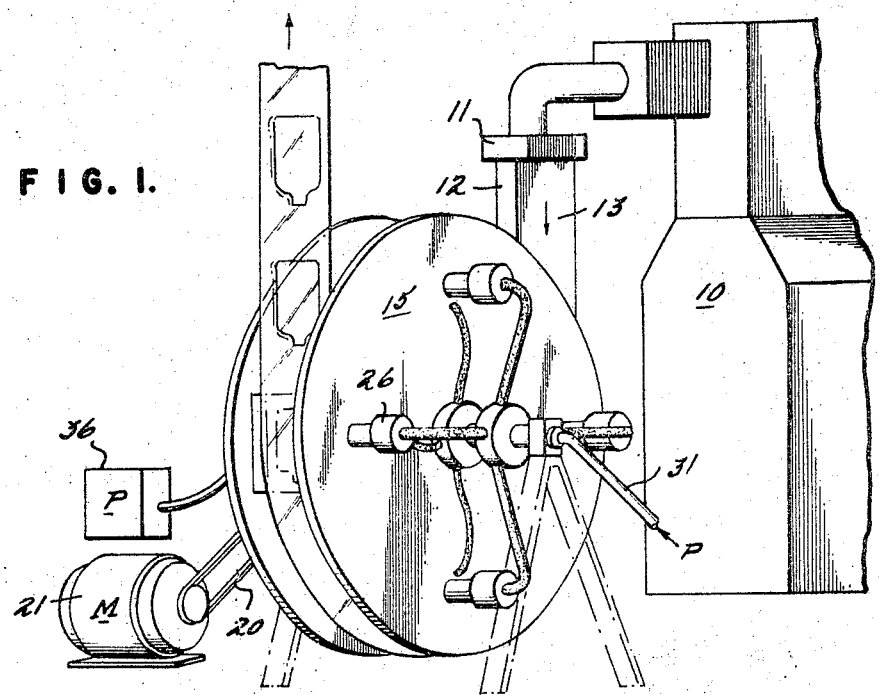
FIG. 1 is a perspective view of an embodiment of an apparatus for practicing the invention.
Figure 2:
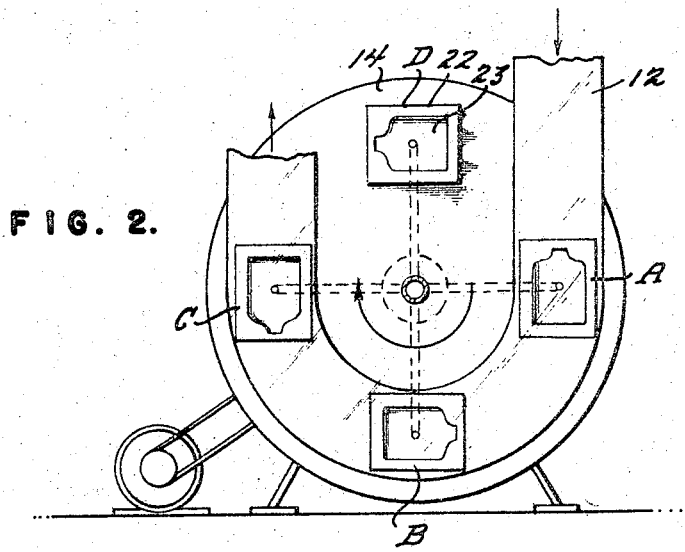
FIG. 2 is an elevational view of one half of the molding structure.

A plurality of mold halves 22 are secured to the inner face or disc 14 and radially spaced thereon, as shown in FIG. 2 of the drawings. These mold halves have die cavities 23. These mold halves 22 are fixed to the disc 14 and arranged as shown in detail on FIG. 2 in such a manner as to carry the sheeting or sheets therearound from the entrance point to the discharge point through an arc of approximately 180°. A plurality of identical mold halves 24 are mounted on disc 15 for rotation therewith, and the mold haves on the two discs are positioned to coact with one another to permit forming of a completed container. The mold haves 24 have die cavities 25 similar to die cavities 23. Preferably, a raised edge is provided around the periphery of the die cavities in either one or both halves of the mold. The mold halves 24 are slidably mounted so that they can be moved into contact with the mold halves 22, under pressure, to seal together the two container halves formed in opposed ones of the mold halves.

The mechanism for accomplishing this movement is shown in detail in FIG. 7 and consists in an air cylinder 26 having a piston 27 therein. A piston rod 28 is connected to the piston 27 and at its opposite end carries the mold 24. An air inlet 29 is provided into the air cylinder and a spring 30 is interposed between the piston 27 and the end of the casing of the air cylinder to permit retraction of the mold upon release of pressure from the air cylinder.

During the cycle of operation, as will be described hereinafter, air under pressure from a suitable source, not shown, is introduced into the air cylinder 26 which acts to move the piston 27, and, accordingly, the mold 24 outwardly into contact with the mold 22 under pressure to effect a sealing of the container halves. Upon release of pressure in the air cylinder, during the cycle, the spring 30 will retract the mold 24 to its original position.

The sequence of operation of the apparatus according to the present invention consists of four phases which will be explained with reference to the four mold halves carried by the disc 15. The first position is effected at point A and the corresponding mold halves carried by discs 14 and 15. This consists in vacuumizing the mold cavities so as to draw the sheets 12 and 13 thereinto for forming. The sheets 12 and 13 are in proper condition for this molding due to the inherent heat of extrusion from the extruder. As the disc rotates, these same mold have move to position B, while vacuum is maintained in the mold halves. At point B, the mold haves 24 are forced inwardly into molding and sealing contact with mold halves 22, and the still hot sheets are sealed or welded around the periphery of the mold cavities. This pressure is maintained from position B to position C, during which time the sheet is cooling to a point below its distortion temperature. At point C, the mold half 24 is retracted by means of spring 30, pressure having been released from the air cylinder 26, and the sheet containing the finished and sealed containers is lead off in a direction 180° opposite from the lead in position of the extruded sheets. At point D, the mold halves are inactive.

In order to accomplish this sequence of operation, or steps, a timed valving arrangement leading to pressure and vacuum means is required. While many different forms of mechanism for accomplishing this result can be utilized, one embodiment is shown in the drawings and will be described without limiting the invention thereto. The axle 16, as heretofore stated, is hollow. A pressure of line 31 from a pressure source, not shown, leads into the axle 16 at the right-hand side of FIG. 3 to a point where a hub or collar 32 is mounted on the axle for rotation therewith.

The axle at this point has four tapped bores therethrough, out of which four pipes 33 extend and which lead respectively to the inlet openings 29 of the air cylinders 26 for actuation of the four half molds 24. The pressure line 31 has a peripheral slot 34 extending from part-way between position A and B to approximately position C. As the axle 16 rotates, various ones of the pipes 33 will pass over the peripheral slot 34, and thereby air under pressure will be introduced into selected ones of the air cylinders 26 to thereby move the mold halves 24 effected thereby. Subsequently, after the plastic material has cooled, pressure is released from the air cylinder, and by means of spring 30, the mold halves are separated from one another.

A vacuum line 35 connected to a vacuum pump 36 leads into the axle 16 at the opposite end from the pressure lead 31. This vacuum line 35 has peripheral slots 37 and 38 where hubs 39 and 40 surround the axle 16, and which are secured to the discs 14 and 15 respectively. The hubs 39 and 40 have vacuum leads passed therethrough, and enter into tapped bores in the axle in the same manner as the leads 33 shown in FIG. 6. These leads 41 and 42 respectively lead to the mold halves 22 and 24. The position of the slots 37 and 38 will place the mold halves under vacuum from approximately position A to position B.

A collar 43 spaces and positions the hubs 32 and 40. A bracket 44 maintains lead 31 in proper position, and bracket 45 on stand 46 prevents the vacuum line 35 from moving inside of the axle. The pressure and vacuum lines 31 and 35, accordingly, are maintained in proper position to give the proper sequence of operation.

The method of the present invention will be readily understood from the foregoing description. Briefly, however, two parallel sheets of thermoplastic material 12 and 13 are extruded from the single die 11 vertically downward into the container forming and sealing machine. The forming machine and mold halves 22 and 24 are rotating in the direction as shown by the arrow in FIG. 2, at a speed whereby the outer circumference is turning at approximately the same linear speed as the two sheets. When mold cavities 22 and 24 are directly in line with the sheeting, a vacuum is drawn on both mold halves through vacuum pump 36 to form half containers, and thereafter the mold half 24 is forced against mold half 22 by means of the air cylinders 26. In this manner, a seal is effected at the edge of each cavity just as the sheeting becomes completely formed by vacuum. A raised edge around the periphery of the mold cavities in either one or both halves applies sufficient pressure to form a seal around the container. By applying sufficient pressure through air cylinders 26, the material under pressure can be extruded to form a bead weld on the inside of the container leaving a tear seal at the outer surface of the container which permits it to be knocked or torn from the selvage. The two hot sheets direct from the extrusion die are vacuum formed simultaneously while still hot, and before the inner surfaces away from the mold faces have dropped in temperature, a seal or weld is effected by forcing the two molds together causing contact of the hot material around the periphery of each cavity. The molds are held closed under pressure until the seal and the formed container have chilled sufficiently to then open the two halves, which release the completed container and the strip of plastic from which it was made. The container is then removed from the strip and the strip is ground and re-used.

Although the drawings show the cooled sheet leaving the disc tangent at a point approximately 180° from the point where the forming takes place at station A, in practice, since this sheet has a curvature equivalent to the diameter of the disc, 180° twist can be put in it after it emerges from the disc which carries it directly into a granulator which can be placed in tandem with the extruder and the container making machine. While it is normally preferred to completely form each of the two container halves before the seal is made, it is possible to accomplish these two operations simultaneously. However, sufficient forming must have already occurred at the time of sealing so as to define the edges of each cavity and prevent the sheeting from sticking together entirely across their faces. Such a procedure results in a partial vacuum on the interior of the bottle and causes it to collapse when the forming vacuum is released and the bottle or container removed from the mold. This can be overcome by forming an opening at any point along the periphery of the cavities, which allows atmospheric air to enter until the pressure on the inside and outside of the bottle are equalized.

As previously indicated, an important advantage of the present invention over other container apparatus currently being used is that completely closed containers can be made. Also, containers having more uniform thickness in overall wall structure with additional reenforcing thickness in selected critical areas can be produced by the present invention, due to the fact that the thickness of the extruded sheets can be varied in cross-section by initial adjustments in the extrusion die. This adjustment feature is illustrated in FIGS. 11 and 12 which will later be described more in detail, but it may be stated at this point that this or similar means of adjustment may be employed in connection with the rotary embodiment of the invention just described.

Turning now to the modified continuous process diagrammatically illustrated in FIG. 8 which shows the general organization of one form of apparatus which may be employed, molten plastic material from an extruder (not shown) is conducted through conduit 50 to a dual die 51, hereinafter described more in detail, which simultaneously extrudes two separate sheets of plastic 52 and 53. It will be understood that the die openings are parallel and transversely spaced so that the extruded sheets are fed to the mold mechanism in opposed, spaced relation.

The mold mechanism generally represented by the numeral 54 comprises two vacuum mold halves 54a and 54b, respectively arranged for reciprocation in a fixed horizontal plane into and out of molding engagement with respective sheets 52 and 53. As hereinafter described more in detail, the mold 54 is designed for vacuum forming and in order to facilitate the continuous operation of the process, is located a sufficient distance below the die 51 to provide a space between the die and the molds, when the latter are closed, in which the continuously extruded sheeting can be gathered, hanging in mid-air only under the influence of gravity. In other words, in the present embodiment of the invention, the molds do not rotate or move vertically during the forming operation, and although the sheet material is being continuously extruded, in actual practice this sheeting, which is under some tension at the time the mold halves close, tends to contract or absorb more volume by growth in width and thickness, and during this time interval, when the molds are closed, the space between the top of the molds and the die can accommodate the material extruded in this phase of the cycle, so that it does not pile up in a heap on the top of the molds.

The principal steps of the forming cycle of the process will best be understood by reference to FIGS. 9A to 9E inclusive. FIG. 9A shows the position of parts in that period of the continuous operation just after the web or selvage 55 composed of the joined sheets 52 and 53 and a formed container 55a have been pulled down from the forming area 54 to present new material for sequential forming by the molds. Here it will be seen that by joining the sheets 52 and 53 as at 55, the unformed portions of said sheets converge after leaving the parallel spaced dies.

Preferably, the sheet 52 is extruded in a substantially vertical direction while the sheet 53, after being joined in the selvage, is angularly disposed with respect to sheet 52 in the area between the open mold halves and the die. Therefore, while the horizontally movable mold half 54a is arranged with its face always parallel to the vertical sheet 52, the opposite mold half 54b is pivotally mounted at one end, as at 56, so that when disengaged from the mold half 54a, the face of the pivoted mold half 54b swings to a position wherein its face is parallel to the angularly disposed sheet 53. By this arrangement, the sheet engaging faces of both mold halves are presented to their respective plastic sheets in parallel relation so that when the mold halves engage the sheets, the air is simultaneously sealed off from the cavity in the molds to enable the proper vacuum forming operation to be accomplished.

As will later be described more in detail, suitable apparatus is provided for causing the respective mold halves to move horizontally into engagement with the respective sheets 52 and 53, the arrangement being such that the mold half 54a moves inwardly slightly in advance of the corresponding movement of the opposite mold half 54b and contacts the sheet 52, initiating the forming of that sheet, as shown in dotted lines in FIG. 9B. After a momentary pause, the pivoted mold half 54b is moved inwardly into engagement with its sheet 53, and by means of the vacuum created in the mold halves, the individual container halves are pre-formed, as shown in dotted lines in FIG. 9C. Alternatively, the molds can contact the sheets simultaneously.

At this point, the container halves are completely formed but not joined and, as shown in FIG. 9D, final inward movement of the pivoted mold half 54b brings the mold halves together, swinging the mold half 54b on its pivot 56, so that the open faces of the molds are parallel to effect a seal between the two formed halves of the container. It will be understood that between the cycle periods illustrated in FIGS. 9C to 9D, air is permitted to enter between the two sheets at the top and ends where space still remains unobstructed, and as soon as the parts are fully formed, the molds close together to effect the seal of the two halves, and during this period material for the next cycle is accumulating between the molds and the die, as before stated.

Upon completion of the forming and sealing operations, the mold halves are withdrawn from contact, leaving the formed container 55a attached to the selvage 55, as shown in FIG. 9E. During the course of the sequential steps just described, the formed portions of the sheets are cooled by means of the introduction of water in cooling jackets provided in the mold halves, as will be explained more in detail with reference to one form of apparatus for practicing this process. As will also be explained, the open faces of the mold halves are provided with knife edges designed to only partially cut through the thickness of the sheets at the time of forming, a cut of approximately 90% of the thickness of the sheet, so that the formed containers remain in the selvage 55 and are drawn away thereby on a suitable take-off mechanism to a point where the operator inspects and removes the containers from the selvage.

Returning to FIG. 8, the take-off mechanism generally indicated by the numeral 57, comprises two coacting endless belts or chains 58 and 59, respectively adapted to pass over a series of rollers 60 and 61 and arranged in sets adjacent opposite longitudinal edges of the selvage 55. Each set of belts or chains 58-59 is so arranged that adjacent parallel runs thereof pass between pairs of opposed rollers 60-61 in gripping or pinching engagement with respective edges of the selvage 55. The belts are power driven by any suitable means, such as the device shown at 62, connected to the rollers by a drive chain 63 so that the respective endless belts conduct the selvage 55 carrying the formed containers 55a to a suitable point A for manual removal of the containers, from whence the remaining selvage is conducted to a granulator (not shown) for re-use.

To accommodate the momentary halting of the plastic sheets 52 and 53 and the selvage 55 during the actual forming step, it is desirable to provide for the intermittent operation of the drive device 62 so as to drive the belt or chain intermittently through a stroke equal to the amount of vertical pull down of the extruded dual sheets. This take-off drive 62 may include a rack 64 driven by the piston of a cylinder 65 and operating a drive pinion 66 in conjunction with any suitable one-way clutch. Obviously, the operation of this rack and piston will be coordinated by any suitable means with the mold forming step.

While belts can be used in this take-off mechanism, it has been found that chains are preferable as they do not stretch and can be cycled faster with less wear.

Referring more specifically to one embodiment of an apparatus for practicing this invention, attention is directed to FIG. 10, and for clarification it may be noted that FIG. 10 is a perspective view looking at the opposite side of the apparatus from that diagrammatically illustrated in FIG. 8. In other words, the hinged mold half 54b is shown on the left side of the dual sheets in FIG. 10, while the reverse is true in FIG. 8.

The vacuum mold halves 54a and 54b are mounted for horizontal reciprocation by means of suitable rollers 67 running on guide rails 68 supported on a frame 69. The rollers 67 are mounted on opposite sides of respective mold halves and the guide rails 68 are positioned to insure accurate alignment of the two mold halves when they meet. Hydraulic cylinders 70 and 71, supported by the frame 69, are operatively connected to the outer ends of the respective mold halves 54a and 54b by means of plunger rods 72, and any suitable control means (not shown) interposed in the hydraulic line 63 may be employed for properly timing the operation and progressive closing of the mold halves with respect to one another, as well as the timing of the operation of the rack 64 in the take-off mechanism 57.

The structure of the molds per se will best be understood by referreing to FIGS. 13 and 14 in conjunction with FIG. 10. Each of the mold halves is provided with a mold cavity 54c of a contour to form one-half of the ultimate container. Each of these cavities is bounded by a forwardly projecting knife edge 73 which, as before stated, is designed to only partially cut through the thickness of the extruded sheets during the forming cycle, so as to leave the formed containers supported by the selvage.

Each of the cavities 54c is connected at 74 to a vacuum line 75 leading from a source not shown, the operation of said vacuum being controlled and coordinated by any conventional control mechanism. The molds are designed with water cavities 76, best seen in FIG. 15, extending over their entire back surfaces for fast cooling, water being circulated through openings 77 by means of suitable hose connections 78 fed from a water supply line 79.

In the embodiment shown in FIG. 10, the rear face of each mold half is backed up by a platen 80 which serves as the supporting member for respective molds, as well as the structural member through which the force from the hydraulic cylinders 70 and 71 is applied. The platens 80 are supported on parallel side plates 81 which, in turn, carry the rollers 67 for engagement with the guide rails 68.

The pivoted mold half 54b in the embodiment illustrated in FIG. 10 is intended for use in the manufacture of containers of smaller capacity, such as quarts, gallons and five-gallons, and here it will be seen that the pivots 56 are supported in side frames 82 and extend through mounting plates 83 fixed to opposite sides of mold half 54b adjacent its forward edge. The rear face of this mold half is disconnected from both the platen 80 and the side frames 82, and the location of the pivots 56 is such as to permit the mold half to swing slightly downwardly about the pivots when its forward face is disengaged from the opposite mold half 54a, so as to present the open face of mold half 54b to the angularly disposed plastic sheet 52 in parallel relation thereto. A transverse slot or clearance space 84 may be provided between the mold half and platen at the adjacent edges of their upper surfaces to accommodate the swinging movement of the mold half. In this connection, it may be stated that the pivotal movement is relatively slight, and the mold half is stopped at a point where the bottom edge thereof is approximately a quarter of an inch from the opposite mold half and its top edge is approximately an inch and a half from the other mold half.

The particular embodiment of mold half shown in FIGS. 13 and 14 is intended for use in the manufacture of larger containers, such as fifteen gallon containers, and embodies a trunnion connecting bar 85 connected between brackets 86 secured to opposite side frames 82 to insure that the pivots 86 remain parallel. Otherwise, its operation is the same as that described in connection with FIG. 10.

In order to maintain the extruded sheets 52 and 53 out of contact with one another between the die and the actual forming step, a water cooled rod 51a is preferably provided between the sheets and above the mold halves. This rod is connected in any convenient manner to the water system 79 and suitably supported on the main frame 69 by means not shown. It may be stated that if the sheets are not separated, atmospheric air cannot enter the molds when the halves are formed, and the ultimate container would not retain its shape after the molds were opened, since a partial vacuum would exist inside the container. The rod 51a must be cooled to keep the hot sheets from sticking to it during the draw-down operation.

As previously explained, thickness distribution in the extruded sheets is an important feature of this invention and although other specific die means may be employed for accomplishing this function, that shown in FIGS. 11 and 12 will illustrate a construction which has proven satisfactory. Here it will be seen that the die comprises a main housing 87, having a plastic receiving chamber 88 arranged to discharge downwardly through a throat 89. A longitudinally extending separator bar 90 is centrally disposed in the throat 89 and spaced from opposite sides thereof to form two longitudinally extending parallel passageways 91. The bottom face of the die housing 87 is provided with two adustable outer die lips 92 and 93, and a common central die lip member 94, the adustable die lips 92 and 93, as best seen in FIG. 11, comprising elongated bars of resilient metal spaced on opposite sides of the central lip member 94 to provide continuations of the passageways 91.

The adjustable lips 92 and 93 are connected to side frames 95 which are bolted as at 96 along opposite lower edges of the housing 87. The frames 95 are spaced outwardly from the lips 92 and 93, and by means of a series of spaced adjusting nuts and bolts 97, any intermediate area of the adjustable lips may be flexed either toward or away from the central lip member 94 to vary the width of the extrusion passageways 91 at selected intervals. Thus, as shown in FIG. 11, the central portions of the passageways 91 are adjusted to provide greater thickness in the extruded sheets at those parts of the die lips which are in line with the deepest parts of the mold halves, so as to afford greater initial thickness in selected continuous areas in the sheets to compensate for stretching during the forming operation. Similarly, any other areas which require greater thickness for strength or durability in the finished product may be provided for in this manner.

An alternate system embodying the essential features of this invention is illustrated in FIGS. 16A to 16D and is primarily intended for use in the manufacture of larger containers, such as those of fifteen gallon size, for example. In this form of the invention, the operation is semi-continuous in that the sheets of plastic material extruded from the die 51 are intermittently ejected in an operation coordinated with the opening and closing of the molds 54. In other words, although the main extruder operates continuously, sheeting is ejected from the die lips intermittently under the action of a plastic accumulator generally indicated by the numeral 98.

This accumulator consists of a cylinder 99 into the bottom of which molten plastic from a main extruder is introduced through connection 100. A plunger 101 is designed to reciprocate vertically in the cylinder 99 in coordination with the opening and closing of the mold halves 54a and 54b which operate essentially the same as those previously described with the exception that neither mold half is pivoted.

Thus, in the position shown in FIG. 16A, the cylinder 99 is acumulating plastic while the mold halves are in open position, after releasing a previously formed container 55a. While the mold halves are still in open position as shown in FIG. 16B, the plunger 101 is depressed in cylinder 99 to cause the ejection of the dual sheets 52 and 53 between the open mold halves, which then partially close as shown in FIG. 16C to points where their open faces engage the plastic sheets and vacuum form individual halves of containers on respective sheets. In FIG. 16D, the mold halves have completely closed to seal and partially sever the containers, during which time the plunger 101 has returned to its uppermost position in cylinder 99 to accumulate further plastic therein.

In this form of the invention, the mold halves are located considerably closer below the die 51 as the accumulation of plastic is accomplished in the accumulator 98. To facilitate sheet feeding in the forming operation, a pull-down mechanism illustrated in detail in FIGS. 17 and 18 is employed. A hollow pull-down bar 102 is mounted horizontally between two laterally spaced vertical air cylinders 103 and is vertically reciprocable by means of piston rods 104. End guide members 105, operating in conjunction with vertical tracks 106, stabilize the vertical movement of the pull-down bar 102.

The pull-down bar is interposed between the extruded sheets 52 and 53 as seen in FIG. 16A, and the periphery of the bar is provided with a series of openings 107, leading to the interior chamber of the pull-down bar which is connected by line 108 to a source of vacuum. Thus, the periphery of the pull-down bar under the action of vacuum is caused to adhere to the plastic sheets 52 and 53 which are pulled downwardly by the bar as it descends between the open mold halves 54, as shown in FIG. 16B.

The application of vacuum to the pull-down bar and the vertical reciprocation thereof by cylinders 103 are coordinated with the opening and closing of the mold halves by any suitable means, not shown. Thus, in operation, when the mold halves reach fully open positions as shown in FIG. 16A, releasing the previously formed and sealed container 55a, the pull-down bar has reached its uppermost position above the mold halves and immediately below the die 51. Just prior to closing movement of the mold halves, and coordinated with the functioning of the plastic accumulator 98, the pull-down bar moves downwardly between the open mold halves in gripping engagement with the spaced sheets 52 and 53 in abutting relation to the previously formed container 55a, pushing the container downwardly and pulling with it the plastic sheets to present a new area to be formed. The pull-down bar is then returned to its uppermost position as shown in FIG. 16C, during which movement the mold halves have partially closed into forming engagement with the plastic sheets. After the mold halves have formed individual container halves, the closing of the molds, as shown in FIG. 16D, seals the mold halves to form complete containers, after which the operation shown in FIG. 16A is repeated.

The pull-down bar 102 is preferably cooled by water jacket 109 connected to the water system by tubes 110 which facilitates the gripping action of the bar, but prevents sticking of the sheeting thereto.

The formed containers still attached to the selvage may be conveyed by a take-off mechanism, such as previously described, or deposited on a ramp (not shown) which supports the weight of the containers to be later removed manually from the selvage.

From the foregoing, it is believed that the invention may be readily understood by those skilled in the art without further description, it being borne in mind that numerous changes may be made in the details disclosed without departing from the spirit of the invention as set forth in the following claims.

I claim:

1. Apparatus for manufacturing plastic shipping and storage containers, comprising a die member having two laterally spaced sets of die lips adapted to simultaneously extrude two spaced sheets of thermoplastic material, a pair of independently mounted, horizontally separable mold halves disposed adjacent said die member with the openings of their respective cavities in opposed relation, means for presenting said spaced sheets between and respectively in parallel relation to the adjacent openings of said mold halves for contact with their respective open cavities while said mold halves are separated, means to bodily shift said mold halves horizontally and substantially simultaneously toward one another for effecting initial contact of said sheets with respective separated mold halves, means coordinated with said last-named shifting means for supplying vacuum to each of the separated mold halves in immediate advance of said initial contact to completely pre-form separate container halves from the contacted areas of respective spaced sheets, and means for continuing the bodily shifting of said mold halves to closed position with opposed boundaries of complementary mold cavities presented for simultaneous contact in a flat plane while still subjected to said vacuum to seal said pre-formed container halves and form complete containers.

2. Apparatus as claimed in claim 1, wherein said die member includes means for selectively adjusting the thickness of said sheets to provide thickness distribution in continuous, longitudinally extending areas of said extruded sheets.

3. Apparatus as claimed in claim 1, wherein the die lips of said die member are selectively adjustable laterally at points intermediate their extremities to provide thickness distribution in continuous, longitudinally extending areas of said extruded sheets.

4. Apparatus as claimed in claim 1, wherein the sheet engaging faces of said mold halves are provided with shallow cutting edges bounding respective mold halves and adapted to partially sever said sheets around said pre-formed container halves simultaneously with the final closing of said mold halves.

5. Apparatus for manufacturing plastic storage and shipping containers, including a die member having two laterally spaced sets of parallel die lips adapted to simultaneously extrude two spaced sheets of thermoplastic material, a pair of opposed mold halves independently mounted on a supporting frame for horizontal movement into and out of forming engagement with intervening areas of respective sheets, means for supplying vacuum to said molds while in open position, progressive means coordinated with said vacuum supply means for horizontally shifting respective mold halves, while subjected to vacuum, into initial engagement parallel with separate sheets to completely pre-form separate container halves and for thereafter finally closing said mold halves with their opposed boundaries simultaneously contacting a flat plane, to join the said sheets and seal said preformed container halves to form complete containers, while still carried by said sheets, thereby causing the posterior spaced areas of said sheets to converge from their points of exit from said die lips, means for opening said mold halves to release said containers, and means for advancing said joined sheets and the complete containers carried thereby to sequentially present the posterior converging areas of said sheets between said open mold halves, at least one of said mold halves being pivotally mounted on a transverse horizontal axis and tiltable when in open position to present its sheet engaging face in parallel relation to the non-joined converging sheet engageable thereby.

6. Apparatus as claimed in claim 5, wherein said mold halves are mounted on horizontal guideways, at least said pivotally mounted mold half being supported on said guideways by side frames reciprocably mounted on the latter, said side frames pivotally engaging said last-named mold half in a forwardly off-center position to permit the mold half, when in open position, to swing forwardly under the influence of gravity to angularly present its sheet-engaging face in parallel relation to said non-joined converging sheet engageable thereby, whereby the engagement of the bottom edge of said angularly disposed mold half with the corresponding edge of the opposite mold half automatically returns said pivoted mold half to a position wherein its sheet engaging face is parallel with that of the opposite mold half to thereby join and seal said preformed container halves.

7. Apparatus as claimed in claim 6, wherein said opposed mold halves are backed up by pressure-actuated platens reciprocably mounted on said guideways, the adjacent edges of the upper surfaces of at least said pivoted mold half and its platen being provided with a clearance space to accommodate the swinging movement of the mold half.

8. Apparatus as claimed in claim 5, including an endless conveyor take-off means for conducting said joined sheeting to a point for the removal of said complete containers.

9. Apparatus as claimed in claim 8, wherein said endless conveyor comprises two laterally spaced pairs of coacting endless bands respectively arranged with adjacent parallel runs thereof in contact for gripping engagement with the longitudinal edges of said joined sheets.

10. Apparatus as claimed in claim 5, including plastic accumulator means associated with said die member for intermittently feeding molten plastic to said die, and transversely extending pull-down means interposed between the spaced sheets extruded from said die and engageable with said sheets above the joined areas thereof, said pull-down means being vertically reciprocable, means for reciprocating said pull-down means in timed relation to the opening and closing of said mold halves and the operation of said plastic accumulator for intermittently engaging said joined areas and progressively advancing said sheets between said mold halves.

11. Apparatus as claimed in claim 10, wherein said pull-down means comprise a cylindrical member including cooling means therefor.

12. Apparatus as claimed in claim 1, including plastic accumulator means associated with said die member for intermittently feeding molten plastic to said die, and transversely extending pull-down means interposed between the spaced sheets extruded from said die and engageable with said sheets above the joined areas thereof forming successive sealed containers, said pull-down means being vertically reciprocable, means for reciprocating said pull-down means in timed relation to the opening and closing of said mold halves and the operation of said plastic accumulator for intermittently engaging said joined areas and progressively advancing said sheets between said mold halves.

13. Apparatus as claimed in claim 1, including transversely extending pull-down means interposed between the spaced sheets extruded from said die and engageable with said sheets above the joined areas thereof, forming successive sealed containers, said pull-down means being vertically reciprocable, means for reciprocating said pull-down means in timed relation to the opening and closing of said mold halves for intermittently engaging said joined areas and progressively advancing said sheets between said mold halves.

14. Apparatus as claimed in claim 13, wherein said pull-down means comprises a hollow pull-down bar connected to a source of vacuum a series of peripheral openings on opposite sides of said bar communicating with the interior thereof and engageable with respective sheets, and means coordinated with said means for reciprocating said pull-down means for controlling the vacuum applied to said pull-down bar.

15. Apparatus as claimed in claim 13, wherein said pull-down means comprises a hollow pull-down bar connected to a source of vacuum, a series of peripheral openings on opposite sides of said bar communicating with the interior thereof and engageable with respective sheets, means coordinated with said means for reciprocating said pull-down maens for controlling the vacuum applied to said pull-down bar, and a cooling jacket for said pull-down bar.

References Cited by the Examiner

UNITED STATES PATENTS

| | | | |
|---|---|---|---|
| 1,574,113 | 2/1926 | Roberts | 264—248 X |
| 1,654,647 | 1/1928 | Heist | 264—90 X |
| 2,387,718 | 10/1945 | Coleman | 18—120 |
| 2,750,624 | 6/1956 | Coates et al. | 18—5 X |
| 2,790,994 | 5/1957 | Cardot et al. | 264—90 |
| 2,890,483 | 6/1959 | Soubier | 18—5 |
| 2,918,698 | 12/1959 | Hagen et al. | 18—5 X |
| 2,995,777 | 8/1961 | Warnken | 156—500 X |
| 3,035,302 | 5/1962 | Lysobey | 18—5 X |

FOREIGN PATENTS

| | | |
|---|---|---|
| 61,855 | 12/1954 | France. |
| 594,957 | 1/1959 | Italy |

J. SPENCER OVERHOLSER, *Primary Examiner.*

WILLIAM J. STEPHENSON, *Examiner.*